United States Patent
Acklam et al.

(10) Patent No.: US 7,128,857 B2
(45) Date of Patent: Oct. 31, 2006

(54) MOULD TOOL AND METHOD FOR RESIN TRANSFER MOULDING

(75) Inventors: Philip J Acklam, Blackburn (GB); Paul Ainsworth, Blackburn (GB); Craig D Carr, Blackburn (GB)

(73) Assignee: BAE Systems plc, London (GB)

( * ) Notice: Subject to any disclaimer, the term of this patent is extended or adjusted under 35 U.S.C. 154(b) by 116 days.

(21) Appl. No.: 10/492,021

(22) PCT Filed: Nov. 1, 2002

(86) PCT No.: PCT/GB02/04978

§ 371 (c)(1), (2), (4) Date: Apr. 8, 2004

(87) PCT Pub. No.: WO03/041947

PCT Pub. Date: May 22, 2003

(65) Prior Publication Data

US 2004/0247722 A1 Dec. 9, 2004

(30) Foreign Application Priority Data

Nov. 13, 2001 (GB) ................................. 0127154.3

(51) Int. Cl.
*B29C 45/14* (2006.01)
*B29C 45/26* (2006.01)

(52) U.S. Cl. .................. 264/102; 264/275; 264/328.1; 425/215; 425/542

(58) Field of Classification Search ................ 425/215; 264/101, 275
See application file for complete search history.

(56) References Cited

U.S. PATENT DOCUMENTS

| 2,803,043 | A | | 8/1957 | Stephens |
| 5,226,997 | A | * | 7/1993 | Vallier ........................ 156/228 |
| 5,516,271 | A | | 5/1996 | Swenor et al. |
| 5,811,049 | A | * | 9/1998 | Kashiwagi .................. 264/263 |
| 6,908,293 | B1 | * | 6/2005 | Furuta et al. ............... 425/116 |

FOREIGN PATENT DOCUMENTS

| EP | 0 294 768 A | | 12/1988 |
| JP | 62-124922 | | 6/1987 |
| JP | 8-207088 | * | 8/1996 |
| JP | 11-348081 | | 12/1999 |

* cited by examiner

*Primary Examiner*—Edmund H. Lee
(74) *Attorney, Agent, or Firm*—Nixon & Vanderhye P.C.

(57) ABSTRACT

A mould tool for use in resin transfer moulding operations is provided, the tool comprising one or more shape-defining portions which together define the shape of a component to be manufactured within the tool, and an inlet path for allowing resin to be injected into the mould tool. The mould tool further comprises at least one bleed cavity and a removable closure member, the closure member being capable of closing the bleed cavity and, in use, substantially sealing the bleed cavity to prevent fluid egress from the bleed cavity. A method of resin transfer moulding is also provided. The method comprises at least the steps of: Providing a mould tool having at least one resin injection inlet, at least one bleed cavity and a closure member, the closure member being capable of closing the bleed cavity and, in use, substantially sealing the bleed cavity to prevent fluid egress from the bleed cavity; Placing a pre-formed component in the mould tool and sealing the bleed cavity; Applying a vacuum to an inlet to remove air from the mould tool; Injecting resin through an inlet into the mould tool, any remaining air being forced into the closed bleed cavity by the resin; Heating the mould tool to cure the resin.

6 Claims, 1 Drawing Sheet

MOULD TOOL AND METHOD FOR RESIN TRANSFER MOULDING

This application is the US national phase of international application PCT/GB02/04978 filed in English on 1 Nov. 2002, which designated the US. PCT/GB02/04978 claims priority to GB Application No. 0127154.3 filed 13 Nov. 2001. The entire contents of these applications are incorporated herein by reference.

The present invention relates to the manufacture of composite structures and more particularly to the field of Resin Transfer Moulding (RTM).

A traditional way of producing composite structures involves manufacturing carbon fibre fabric, impregnating this with resin to make carbon fibre sheets, and then laying up the pre-impregnated carbon fibre sheets over a mould tool before heating the mould tool and sheets to cure the resin and form the structure. In applications where it is vital that the resultant structure must have a uniform thickness, the traditional method using pre-impregnated carbon fibre sheets is not sufficiently accurate. The thickness of the sheets may not be uniform to start with, and the resin may not flow evenly during curing. These factors can lead to the structure being outside the tolerance limit for close tolerance items.

Resin Transfer Moulding (RTM) is becoming a preferred method of manufacturing composite structures where tight tolerances are required. The pre-impregnated carbon fibre sheets are not used in RTM. Instead a carbon fibre fabric is partially impregnated or coated with resin, and several layers of partially impregnated or coated fabric are laid up on a pre-form tool before being pre-formed at approximately 100 C in a vacuum to produce a pre-form structure. This pre-form structure is then placed in a RTM mould tool, which is a closed mould tool suitable for injection moulding. A vacuum is first applied to draw out air, and then a resin is injected into the mould. The mould tool is simultaneously subjected to heat for curing the resin, and pressure for ensuring the mould tool remains closed, thereby allowing the resin to cure to produce the composite structure. The mould is then opened and the composite structure removed.

During the resin injection process, a resin bleed is usually carried out to flush out any remaining pockets of air through one or more open bleed points. It is necessary that the air be flushed out, otherwise parts of the structure will contain air pockets instead of resin and will be weaker than expected. Current RTM processes have several disadvantages, namely: It is difficult to specify and control the resin bleed process, as it usually involves operators observing air bubbles in bleed pipes. This requires judgement and experience from the operators, and precise specifications from the manufacturers. Special control equipment is usually required. Furthermore, resin is wasted during the bleed process. In cases where the operators are not sure whether the air pockets have been removed or not, they will continue to bleed the resin until they are certain that no significant amount of air remains. A significant amount of resin is wasted in this way. Also, due to the somewhat subjective nature of establishing when the air pockets have been expelled, each component can have slightly different characteristics.

The present invention seeks to provide a RTM mould tool and method of use thereof which eliminates the need to specify or control a resin bleed operation during resin injection, and which reduces the amount of resin wasted in the RTM process. Improved process control and product repeatability are also sought.

According to the present invention in one aspect thereof there is provided a mould tool for use in resin transfer moulding operations, the tool comprising one or more shape-defining portions which together define the shape of a component to be manufactured within the tool, and an inlet path for allowing resin to be injected into the mould tool, wherein the mould tool further comprises at least one bleed cavity and a removable closure member, the closure member being capable of closing the bleed cavity and, in use, substantially sealing the bleed cavity to prevent fluid egress from the bleed cavity, and having a flat outer surface to enable the member to fit between the shape-defining portions of the mould tool and a force exerting platen of a press.

The closure member acts as an intermediate portion to protect the mould tool from the platen and vice versa during the pressing process.

Alternatively, the closure member may be a stopper which, in use, extends into the bleed cavity and acts to seal the bleed cavity. A stopper may be used instead of an intermediate portion where the mould tool has its own heating and clamping system.

The mould tool is preferably adapted to allow air to be bled from the same inlet path as the resin is injected through, prior to injection of the resin. This means that only one inlet/outlet path needs to be provided.

A method of resin transfer moulding may comprise at least the steps of:

Providing a mould tool having at least one resin injection inlet, at least one bleed cavity and a closure member, the closure member being capable of closing the bleed cavity and, in use, substantially sealing the bleed cavity to prevent fluid egress from the bleed cavity;

Placing a pre-formed component in the mould tool and sealing the bleed cavity;

Applying a vacuum to an inlet to remove air from the mould tool;

Injecting resin through an inlet into the mould tool, any remaining air being forced into the closed bleed cavity by the resin;

Heating the mould tool to cure the resin.

The resin is preferably injected until the mould tool cannot accommodate any more resin. The vacuum and the resin injection are preferably applied to the same inlet. Preferably there are no open inlets or outlets other than the said inlet for injecting the resin, so that the resin can not leave the mould tool once injected in.

According to the present invention in another aspect thereof there is provided a method of resin transfer moulding comprising at least the steps of:

Providing a mould tool having at least one resin injection inlet, at least one bleed cavity and a closure member, the closure member being capable of closing the bleed cavity and, in use, substantially sealing the bleed cavity to prevent fluid egress from the bleed cavity;

Placing a pre-formed component in the mould tool;

Exerting pressure on the mould tool by means of a press, the platen of the press acting on the closure member and transmitting pressure therethrough to the rest of the mould tool, the closure member acting to close and seal the bleed cavity;

Applying a vacuum to an inlet to remove air from the mould tool;

Injecting resin through an inlet into the mould tool, any remaining air being forced into the closed bleed cavity by the resin;

Heating the mould tool to cure the resin.

The present invention will now be described by way of example only with reference to the following drawings.

Figure 1:
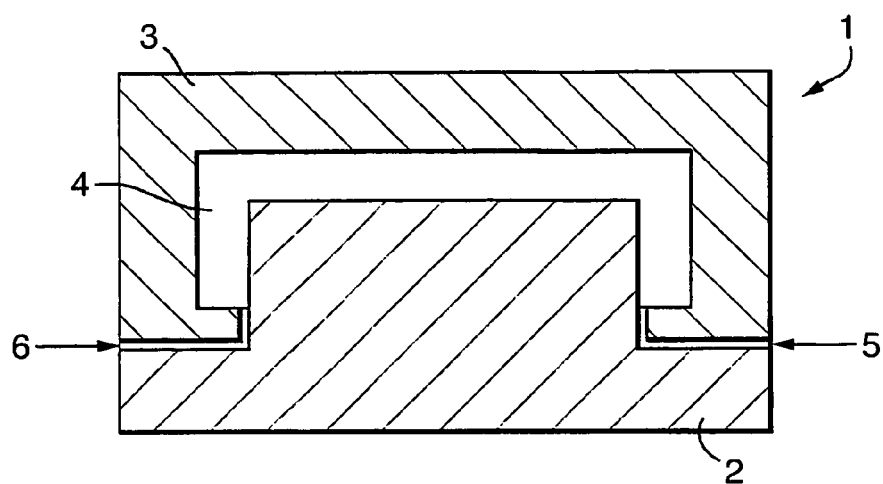
FIG. 1 shows a cross section through a prior art RTM mould tool.

Referring now to FIG. 1, a conventional mould tool 1 comprises a first shape-defining portion 2 and a second shape-defining portion 3. In use, a pre-formed component 4 is placed in the mould tool and the mould tool is placed in a heating press. A vacuum is applied to outlet 6 to draw out air from the mould tool. Following this operation resin is injected into inlet 5, until the operator indicates that the resin exiting the mould tool from outlet 6 contains no further air bubbles. No further resin is then injected into the mould tool and the component is then cured by heating in the press.

Figure 2:
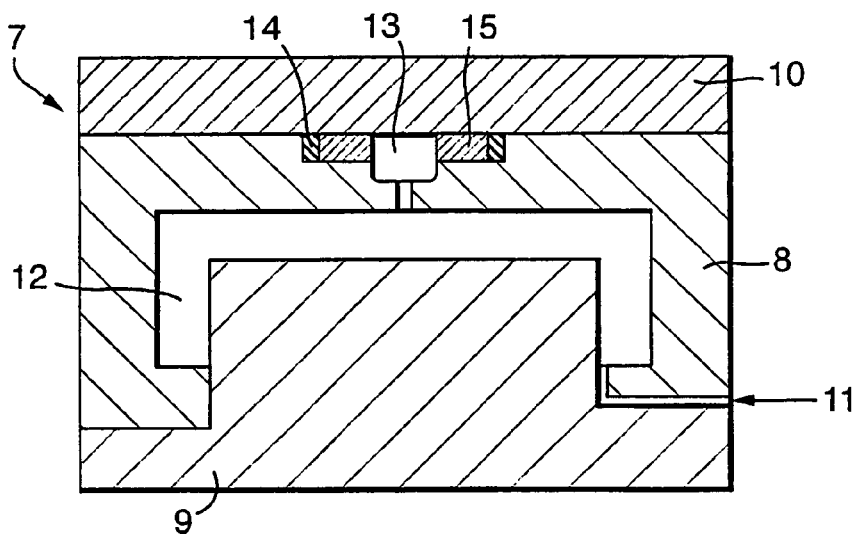
FIG. 2 shows a cross section through a RTM mould tool in accordance with the present invention.

FIG. 2 shows a mould tool having a first shape-defining portion 9, a second shape-defining portion 8 and a closure member in the form of an intermediate portion 10. In use, a pre-formed component 12 is placed in the mould tool and the mould tool is placed in a heating press. The intermediate portion 10 is placed so as to close the bleed cavity 13. When pressure is applied to the intermediate portion by the press, the seal 14 that surrounds the bleed cavity 13 makes contact with the intermediate portion 10 and prevents liquid from the bleed cavity from escaping. A vacuum is then applied to inlet/outlet 11, to remove air from the mould tool. Once most of the air has been removed, resin is then injected into the mould tool via inlet/outlet 11. As resin is injected into the mould tool, it displaces any air which is left, and the air is forced upwards into the bleed cavity 13. The air cannot escape out from the bleed cavity 13 because of the seal 14 and the intermediate portion 10. Resin continues to be injected into the mould tool until it saturates the component and fills the remainder of the bleed cavity. Thus the air is trapped in the bleed cavity by the intermediate portion 10 at the top and the resin at the bottom. The component is then cured by heating in the press.

The resultant component is then removed from the mould. A small resin slug is left in the bleed cavity of the mould tool. The tool is designed so that this resin slug can be easily removed. As shown in FIG. 2, part of the bleed cavity wall is defined by an annular ring 15, which abuts the seal 14. The slug is removed by first removing the annular ring 15, which gives easy access to the slug. A new seal 14 is then installed and the annular ring 15 is put back in place before the next RTM process is carried out.

Figure 3:
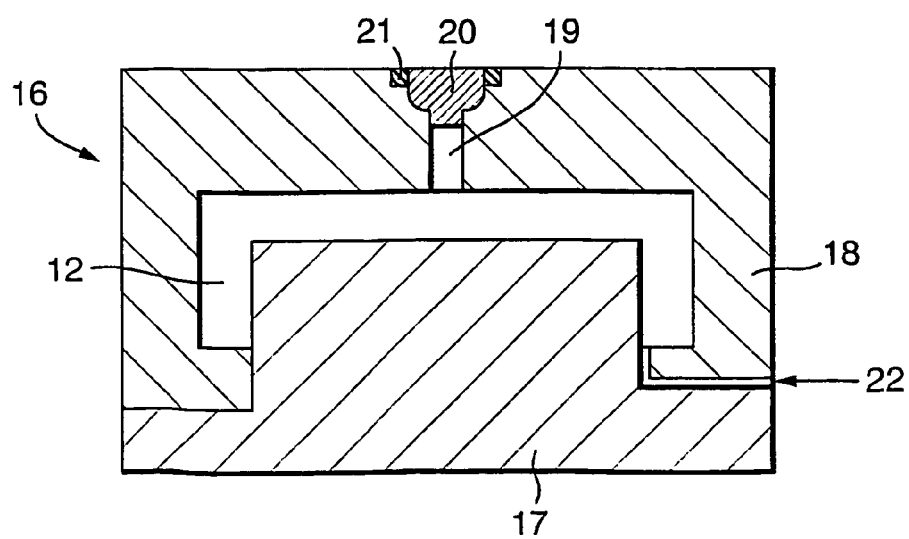
FIG. 3 shows a cross section through a further RTM mould tool in accordance with the present invention.

FIG. 3 shows a mould tool 16 having a first shape-defining portion 17, a second shape-defining portion 18, a bleed cavity 19 and a closure member in the form of a stopper 20. The mould tool 16 has its own heating and clamping system. In use, a pre-formed component 12 is placed in the mould tool and the stopper 20 is inserted into the bleed cavity 19 to close the bleed cavity 19. A seal 21 surrounds the stopper 20 to prevent any resin egress from the bleed cavity. A vacuum is then applied to the inlet/outlet 22, to remove air from the mould tool. Once most of the air has been removed, resin is then injected into the mould tool via inlet/outlet 22. As resin is injected into the mould tool, it displaces any air that is left, and the air is forced into the bleed cavity 19. The air cannot escape from the bleed cavity 19 because of the stopper 20 and seal 21. Resin continues to be injected into the mould tool until it saturates the component and fills the remainder of the bleed cavity 19, trapping the air at the top of the bleed cavity. The component is then cured by heating, and then removed from the mould tool.

Depending on the size and shape of the component to be manufactured, several bleed cavities may be provided. It can be seen that this invention significantly reduces the amount of resin necessary for the RTM process, and provides an improved process control and product quality control.

The invention claimed is:

1. A mould tool for use in resin transfer moulding operations, the tool comprising:
   two or more shape-defining portions which together define the shape of a component to be manufactured within the tool;
   an inlet path for allowing resin to be injected into the mould tool;
   at least one bleed cavity; and
   a removable closure member, the closure member for closing and sealing the bleed cavity to prevent fluid egress from the bleed cavity, said closure member having a flat outer surface to enable the member to fit between the shape-defining portions of the mould tool and a force exerting platen of a press.

2. A mould tool as claimed in claim 1 wherein the closure member has a flat outer surface substantially parallel to an outer surface of the mould tool.

3. A mould tool as claimed in claim 1 wherein the closure member is a stopper which, in use, extends into the bleed cavity and acts to seal the bleed cavity.

4. A mould tool as claimed in claim 1 wherein the mould tool is adapted to allow air to be bled from the same inlet path as the resin is injected through, prior to injection of the resin.

5. A method of resin transfer moulding comprising at least the steps of:
   providing a mould tool having at least one resin injection inlet, at least one bleed cavity and a closure member, the closure member being capable of closing the bleed cavity and, in use, substantially sealing the bleed cavity to prevent fluid egress from the bleed cavity;
   placing a pre-formed component in the mould tool;
   exerting pressure on the mould tool by means of a press having a platen, the platen of the press acting on the closure member and transmitting pressure therethrough to the rest of the mould tool, the closure member acting to close and seal the bleed cavity;
   applying a vacuum to an inlet to remove air from the mould tool;
   injecting resin through said resin injection inlet into the mould tool, any remaining air being forced into the closed bleed cavity by the resin; and
   heating the mould tool to cure the resin.

6. A method of resin transfer moulding as claimed in claim 5 wherein the vacuum and the resin injection are applied to the same inlet.

* * * * *